(12) United States Patent
Chiu et al.

(10) Patent No.: US 10,901,154 B2
(45) Date of Patent: Jan. 26, 2021

(54) FIBER OPTICAL CONNECTOR

(71) Applicant: ACON OPTICS COMMUNICATIONS INC., New Taipei (TW)

(72) Inventors: Chin-Huang Chiu, New Taipei (TW); Chih-Jen Hsiao, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 16/711,023

(22) Filed: Dec. 11, 2019

(65) Prior Publication Data

US 2020/0192034 A1 Jun. 18, 2020

(30) Foreign Application Priority Data

Dec. 13, 2018 (CN) ...................... 2018 2 2088169 U

(51) Int. Cl.
*G02B 6/38* (2006.01)
*G02B 6/36* (2006.01)

(52) U.S. Cl.
CPC .......... *G02B 6/3624* (2013.01); *G02B 6/387* (2013.01)

(58) Field of Classification Search
CPC ..................................................... G02B 6/387
See application file for complete search history.

(56) References Cited

U.S. PATENT DOCUMENTS

| D434,376 | S | 11/2000 | Connelly |
| 6,565,262 | B2 | 5/2003 | Childers et al. |
| 7,658,551 | B1 | 2/2010 | Wu et al. |
| D619,100 | S | 7/2010 | Larson et al. |
| 8,221,007 | B2 | 7/2012 | Peterhans et al. |
| D705,168 | S | 5/2014 | Yamauchi et al. |
| D705,169 | S | 5/2014 | Yamauchi et al. |
| D783,618 | S | 4/2017 | Wu et al. |
| 9,618,703 | B2 | 4/2017 | Iizumi et al. |
| 9,967,983 | B2 | 5/2018 | Coffey et al. |
| D830,304 | S | 10/2018 | Choi |
| 10,520,687 | B2 | 12/2019 | Lee |

(Continued)

FOREIGN PATENT DOCUMENTS

| CN | 104808296 A | * | 7/2015 | ........... G02B 6/3893 |
| DE | 102010055434 B3 | * | 4/2012 | ........... G02B 6/4284 |
| WO | WO-2016082160 A1 | * | 6/2016 | ........... G02B 6/3893 |

*Primary Examiner* — Charlie Y Peng

(74) *Attorney, Agent, or Firm* — Innovation Capital Law Group, LLP; Vic Lin

(57) ABSTRACT

A fiber optical connector includes a connector housing, a slidable block, and a handle. The connector housing includes an elastic arm outwardly and inclinedly extending out of the connector housing. Two sides of the elastic arm respectively include engaging protrusions and protruding blocks. The slidable block is fitted out of the connector housing. The slidable block includes sidewalls and slidable grooves formed on side surfaces of the sidewalls. The protruding blocks are respectively engaged in the slidable grooves, and one side of each of the sidewalls includes a buckling groove. An extension block is extending from a first end of the handle and the extension block is received between the sidewalls. The handle includes buckling blocks located out of the extension block, and the buckling blocks are respectively engaged in the buckling grooves.

10 Claims, 10 Drawing Sheets

(56) References Cited

U.S. PATENT DOCUMENTS

| | | |
|---|---|---|
| 2004/0202431 A1 | 10/2004 | Bates |
| 2009/0269014 A1 | 10/2009 | Winberg et al. |
| 2010/0272397 A1 | 10/2010 | Komaki et al. |
| 2011/0097044 A1 | 4/2011 | Saito et al. |
| 2011/0243506 A1 | 10/2011 | Hsu |
| 2012/0027360 A1 | 2/2012 | Larson et al. |
| 2012/0146660 A1 | 6/2012 | Mattson |
| 2013/0051734 A1 | 2/2013 | Shen et al. |
| 2015/0212283 A1* | 7/2015 | Jiang .................... G02B 6/3898 385/77 |
| 2015/0253517 A1 | 9/2015 | Taira et al. |
| 2015/0331202 A1 | 11/2015 | Rosson |
| 2016/0231512 A1 | 8/2016 | Seki |
| 2016/0327757 A1* | 11/2016 | Lee ....................... G02B 6/3893 |
| 2017/0235063 A1 | 8/2017 | Ahmed et al. |
| 2017/0299818 A1 | 10/2017 | Chang et al. |
| 2018/0217339 A1 | 8/2018 | Ma et al. |
| 2018/0267256 A1* | 9/2018 | Wu ....................... G02B 6/3898 |
| 2018/0321448 A1* | 11/2018 | Wu ....................... G02B 6/3825 |

\* cited by examiner

FIBER OPTICAL CONNECTOR

CROSS-REFERENCE TO RELATED APPLICATION

This non-provisional application claims priority under 35 U.S.C. § 119(a) to Patent Application No. 201822088169.3 filed in China, P.R.C. on Dec. 13, 2018, the entire contents of which are hereby incorporated by reference.

FIELD OF THE INVENTION

The instant disclosure relates to a connector, and more particular to a fiber optical connector.

BACKGROUND

The optical fiber is an tool for optical transmission. An optical connector is used for connecting the optical fiber with different electronic devices, so that the electronic devices can utilize the signals transmitted by the optical fiber. An optical-fiber connector assembly known to the inventor(s) includes an adapter and a male optical-fiber connector. The adapter is assembled to the electronic device. Hence, when the male optical-fiber connector is inserted into the adapter, the male optical-fiber is fixed with the adapter and signals can be transmitted to the electronic device through the fiber optical connector assembly.

SUMMARY OF THE INVENTION

A cabinet for aligning the connectors has a number of jumper wires spaced by limited distance. When one of the jumper wires is to be replaced, the operator cannot press on the elastic arm of the male optical-fiber connector in a convenient manner to detach the elastic arm of the male optical-fiber connector from the adapter. As a result, the operator cannot pull the jumper wires conveniently, and the operator may even damage the jumper wires as well as other jumper wires. Additionally, the number of the jumper wires would be limited by the space of the cabinet provided for assembling the jumper wires.

In view of these, an embodiment of the instant disclosure provides a fiber optical connector comprising a connector housing, a slidable block, and a handle. The connector housing comprises an elastic arm, and the elastic arm is outwardly and inclinedly extending out of the connector housing. Two sides of the elastic arm respectively comprise a pair of engaging protrusions and a pair of protruding blocks. The slidable block is fitted out of the connector housing. The slidable block comprises a plurality of sidewalls and a plurality of slidable grooves formed on side surfaces of the sidewalls. The protruding blocks are respectively engaged in the slidable grooves, and one side of each of the sidewalls comprises a buckling groove. An extension block is extending from a first end of the handle and the extension block is received between the sidewalls. The handle comprises a plurality of buckling blocks located out of the extension block, and the buckling blocks are respectively engaged in the buckling grooves.

In one or some embodiments, each of the sidewalls comprises an engaging block at an opening portion of the corresponding buckling groove, and each of the buckling blocks comprises a stopping block engaged with the corresponding engaging block.

In one or some embodiments, the slidable block comprises a plurality of separation blocks between the sidewalls.

A plurality of extension blocks is further extending from the first end of the handle, and the extension blocks are received between the sidewalls. The handle comprises an extension arm between the extension blocks, and the extension arm is received between the separation blocks.

In one or some embodiments, an end surface of each of the separation blocks forms an inclined surface, and an end portion of the extension arm comprises a shielding plate covering the inclined surface.

In one or some embodiments, one side of each of the separation blocks comprises a mating groove, and two sides of the extension arm comprise mating blocks each engaged with the corresponding mating groove.

In one or some embodiments, the slidable block comprises a receiving groove and a plurality of hooks formed on an inner surface of the receiving groove. An outer surface of the connector housing comprises a plurality of recessed grooves for engaging with the hooks.

In one or some embodiments, the outer surface of the connector housing comprises a plurality of stopping portions abutting against an end surface of the slidable block.

In one or some embodiments, each of the slidable grooves comprises a front inclined surface, a rear inclined surface, and a recessed portion connected to a top portion of the front inclined surface and a top portion of the rear inclined surface.

In one or some embodiments, when the slidable block is moved to a first position, each of the protruding blocks slides to the corresponding front inclined surface and drives the corresponding engaging protrusion to move.

In one or some embodiments, when the slidable block is moved to a second position, each of the protruding blocks slides to the corresponding recessed portion and drives the corresponding engaging protrusion to move.

Accordingly, in one or some embodiments of the instant disclosure, the fiber optical connector is provided with an extension handle, so that the user can operate and force to the handle to move the slidable block in a convenient manner. Moreover, the buckling block of the handle is engaged with the buckling grooves of the slidable block, thereby increasing the mating force between the fiber optical connector and the adapter upon assembling or detaching.

Moreover, in one or some embodiments of the instant disclosure, the extension arm of the handle is received between the separation blocks. Hence, when the handle is used to pull or push the slidable block, the force applied to the handle can be properly distributed over the handle to prevent the deformation at the front end of the handle. Such configuration also allows the user to apply the force to the handle appropriately. Furthermore, two sides of the front end of the handle forms a mating structure, so that the handle can be moved from top to bottom and mated in a corresponding portion of the slidable block, thereby facilitating the assembly of the fiber optical connector.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
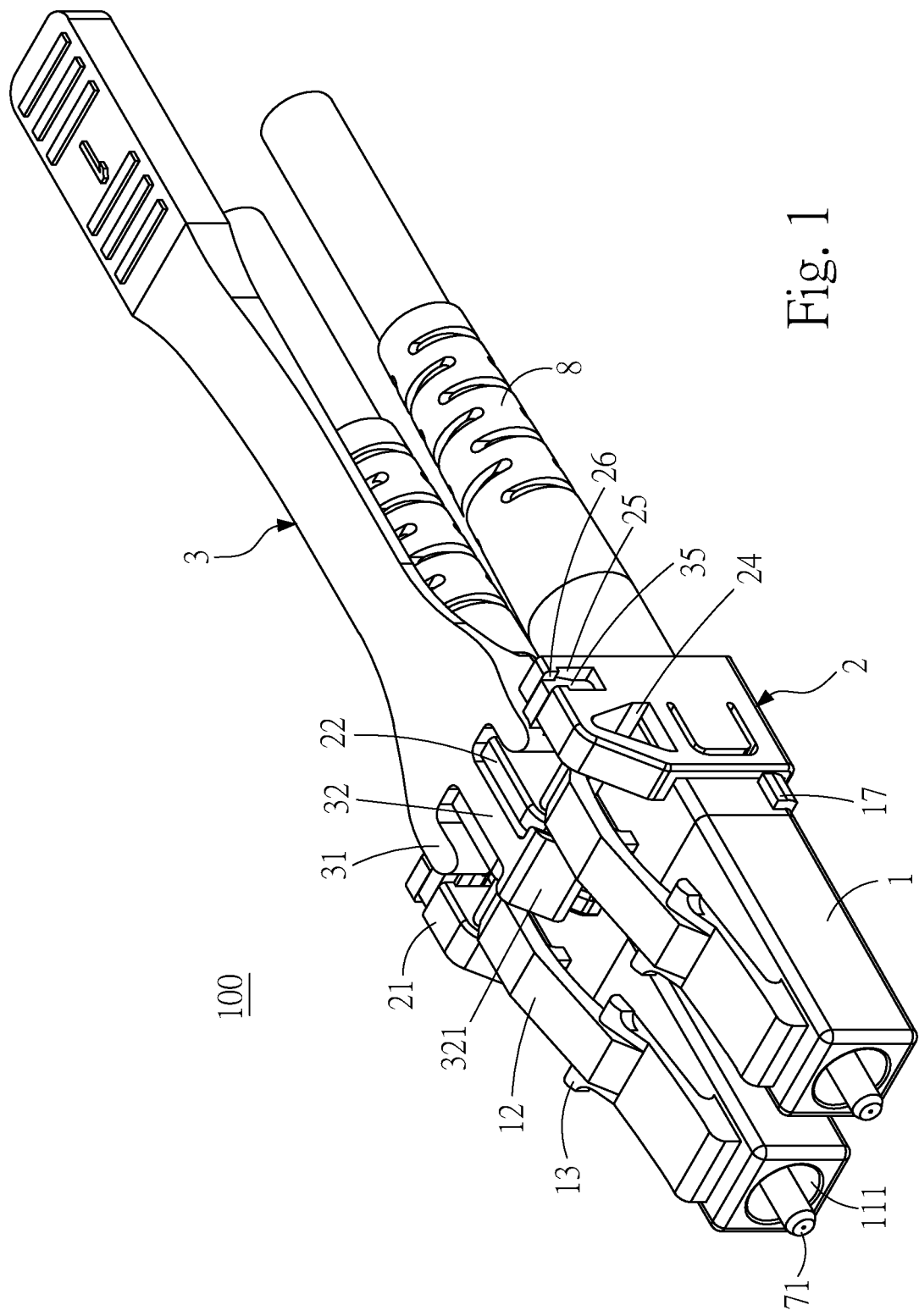
FIG. 1 illustrates a perspective view of a fiber optical connector according to a first embodiment of the instant disclosure.
Figure 2:
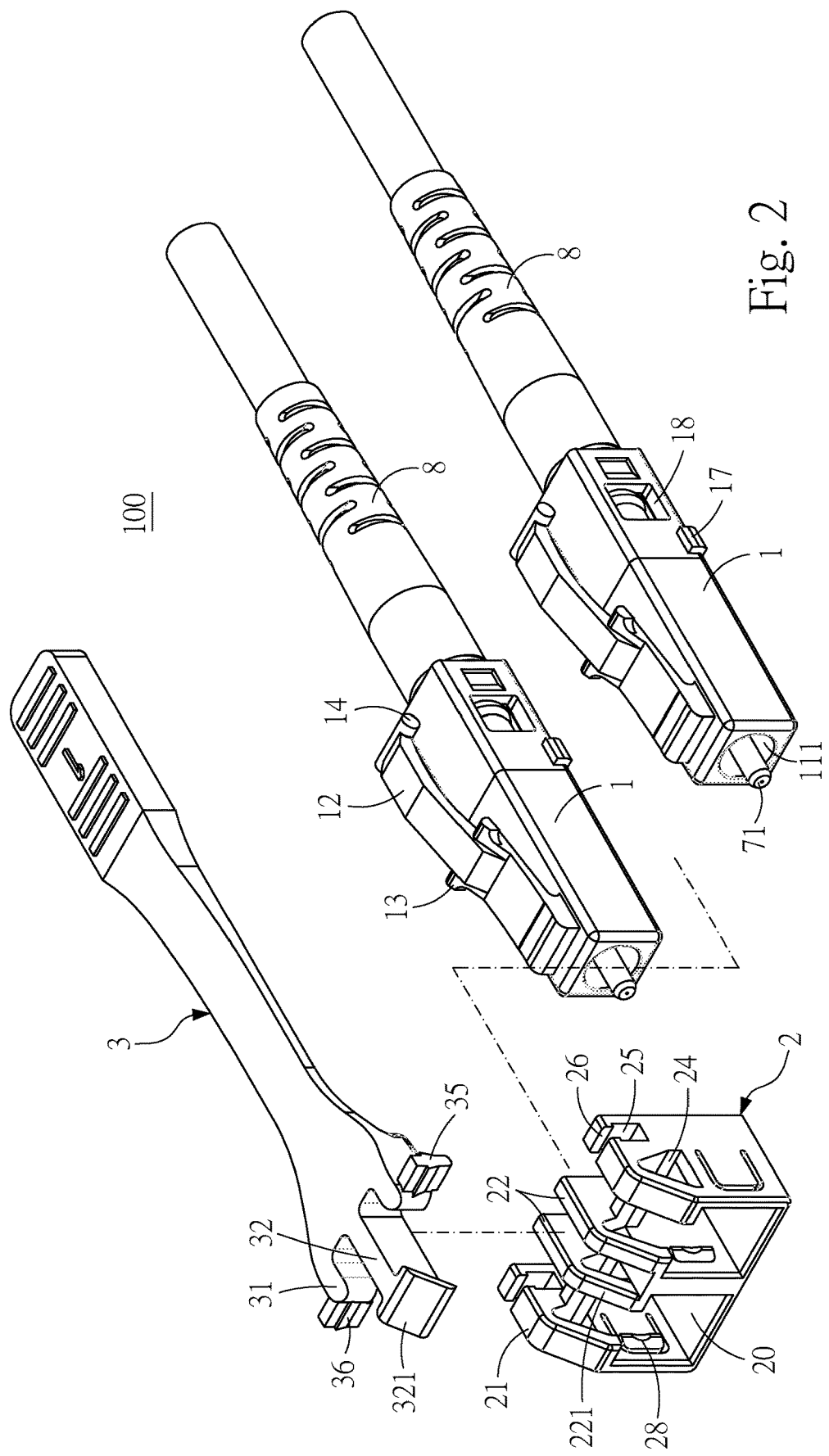
FIG. 2 illustrates an exploded view (1) of the fiber optical connector of the first embodiment.
Figure 3:
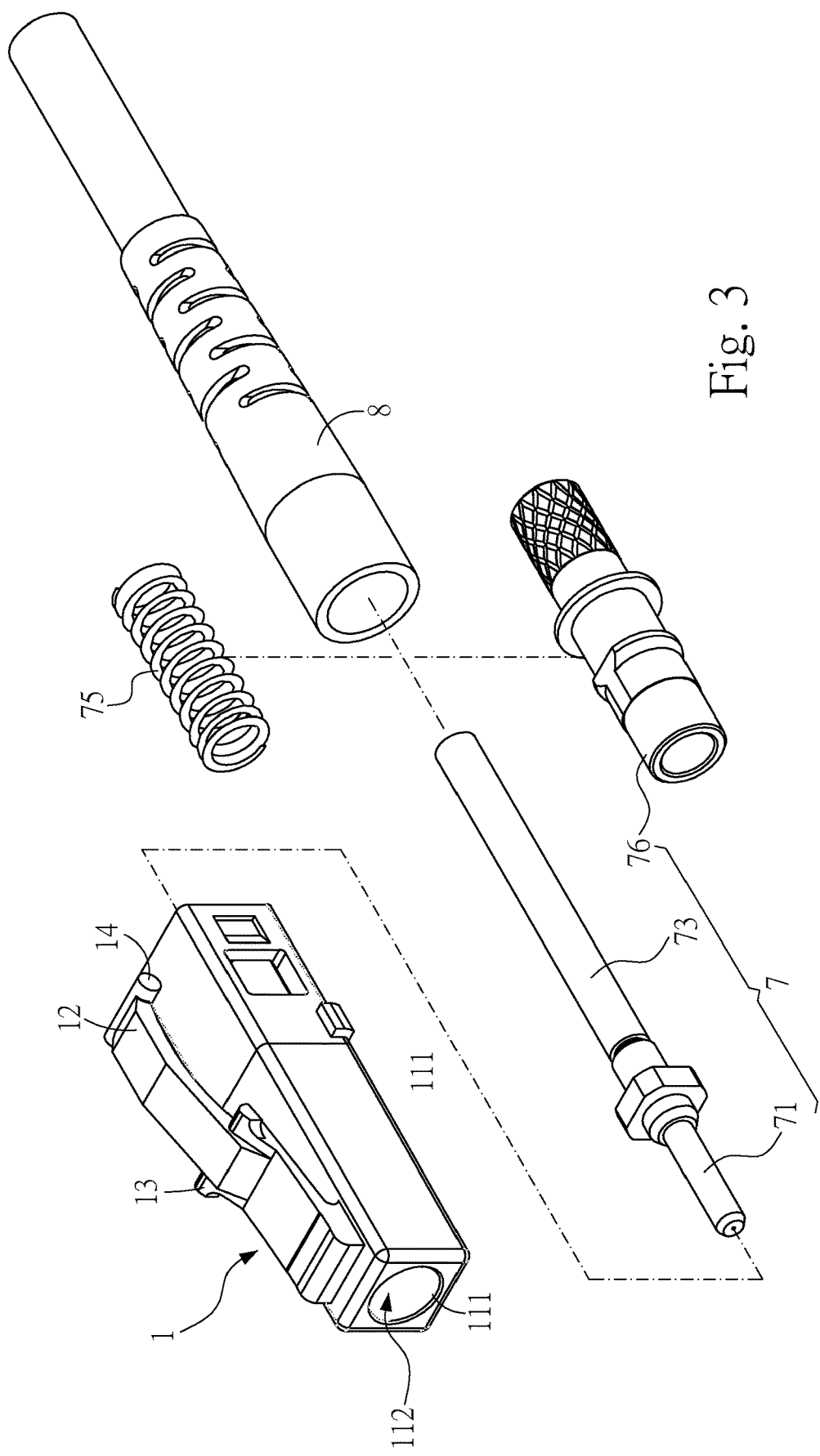
FIG. 3 illustrates an exploded view (2) of the fiber optical connector of the first embodiment.
Figure 4:
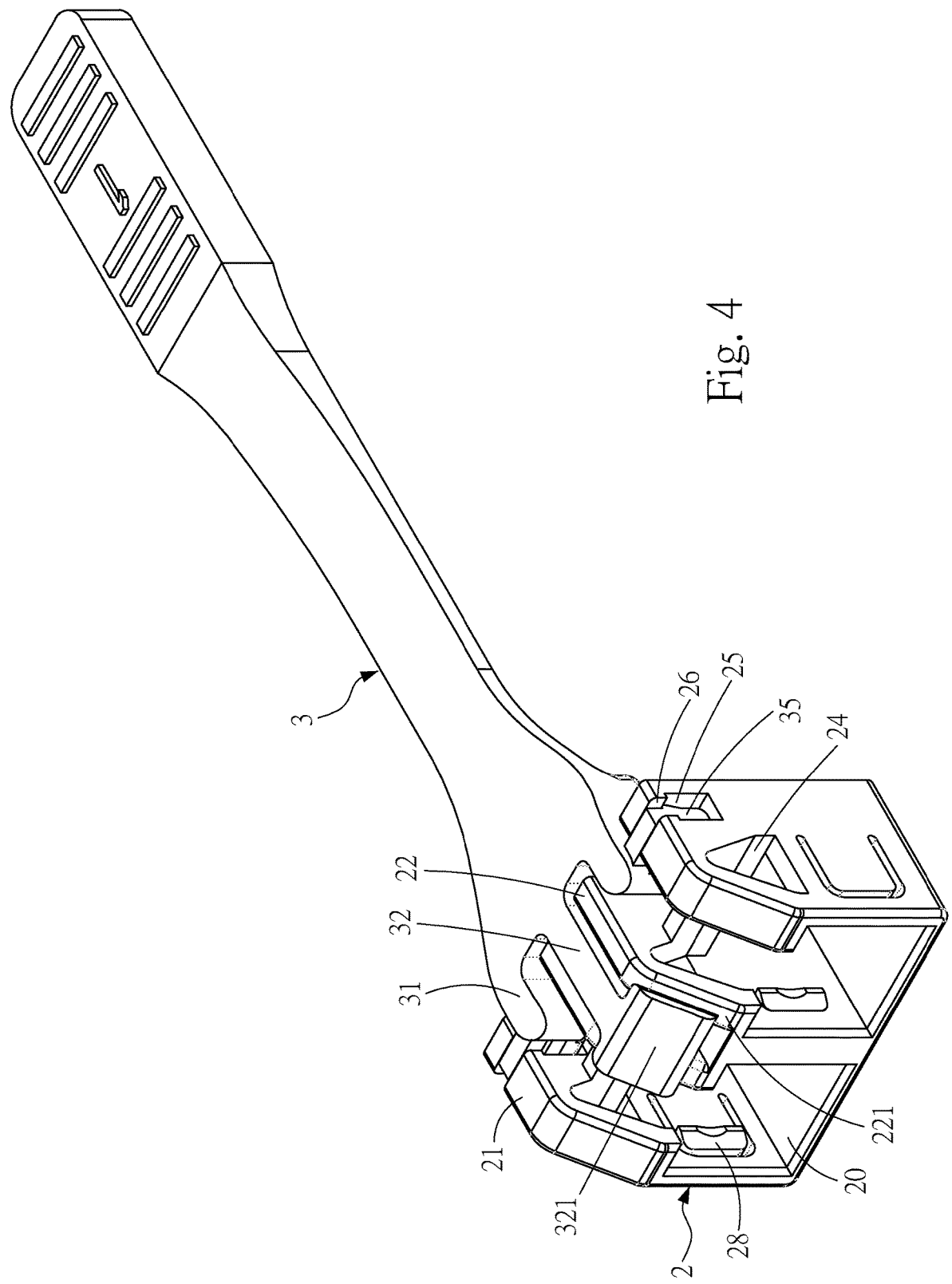
FIG. 4 illustrates a perspective view of a slidable block and a handle of a fiber optical connector according to an exemplary embodiment of the instant disclosure.

Please refer to FIGS. 1 to 4, illustrating a fiber optical connector 100 according to a first embodiment of the instant disclosure. FIG. 1 illustrates a perspective view of the fiber optical connector 100, FIG. 2 illustrates an exploded view (1) of the components of the fiber optical connector 100, FIG. 3 illustrates an exploded view (2) of the connection terminal and the tail cap 8, and FIG. 4 illustrates a perspective view of the slidable block 2 and handle 3. In this embodiment, the fiber optical connector 100 comprises two connector housings 1, but embodiments are not limited thereto. In some embodiments, the fiber optical connector 100 may comprise one, three, or more connector housings 1. In this embodiment, two connector housings 1 are assembled with one handle 3, but embodiments are not limited thereto. In some embodiments, one connector housing 1 may be assembled with one handle 3; alternatively, three or more connector housings 1 may be assembled with one handle 3.

As shown in FIGS. 1 to 4, in this embodiment, the fiber optical connector 100 comprises a plurality of connector housings 1, a slidable block 2, and a handle 3. The connector housings 1 are arranged side-by-side. Each of the connector housings 1 comprises an opening 111 at a front end and a cylindrical chamber 112 through which a terminal end of an optic fiber extends along a longitudinal axis. Each of the connector housings 1 is of a cuboid structure and has a top wall, a base wall, and two side walls. For each of the connector housings 1, the cylindrical chamber 112 is formed inside the connector housing 1, and the opening 111 is formed at the front end of the connector housing 1 and in communication with the corresponding cylindrical chamber 112. Moreover, a spacing is formed between the connector housings 1, the connector housings 1 are arranged side by side, along a horizontal transverse axis perpendicular to the longitudinal axis and a gap is between the connector housings 1 along the horizontal transverse axis. Moreover, a rear end of the connector housing 1 is connected to a tail cap 8, and the tail cap 8 is fitted over the transmission cable.

As shown in FIGS. 1 to 4, in this embodiment, each of the connector housings 1 comprises an elastic arm 12. A front end of the elastic arm 12 is leaning at an angle and outwardly extending out from an outer surface of the top wall at the front end of the connector housing 1, and a rear end of the elastic arm 12 is above the outer surface of the top wall at the rear end of the connector housing 1. A height difference is between the rear end of each of the elastic arms 12 and the outer surface of the corresponding connector housing 1 along a perpendicular transverse axis perpendicular to the horizontal transverse axis and the longitudinal axis, indicating that the elastic arm 12 is located at a preset position above the connector housing 1.

Figure 8:
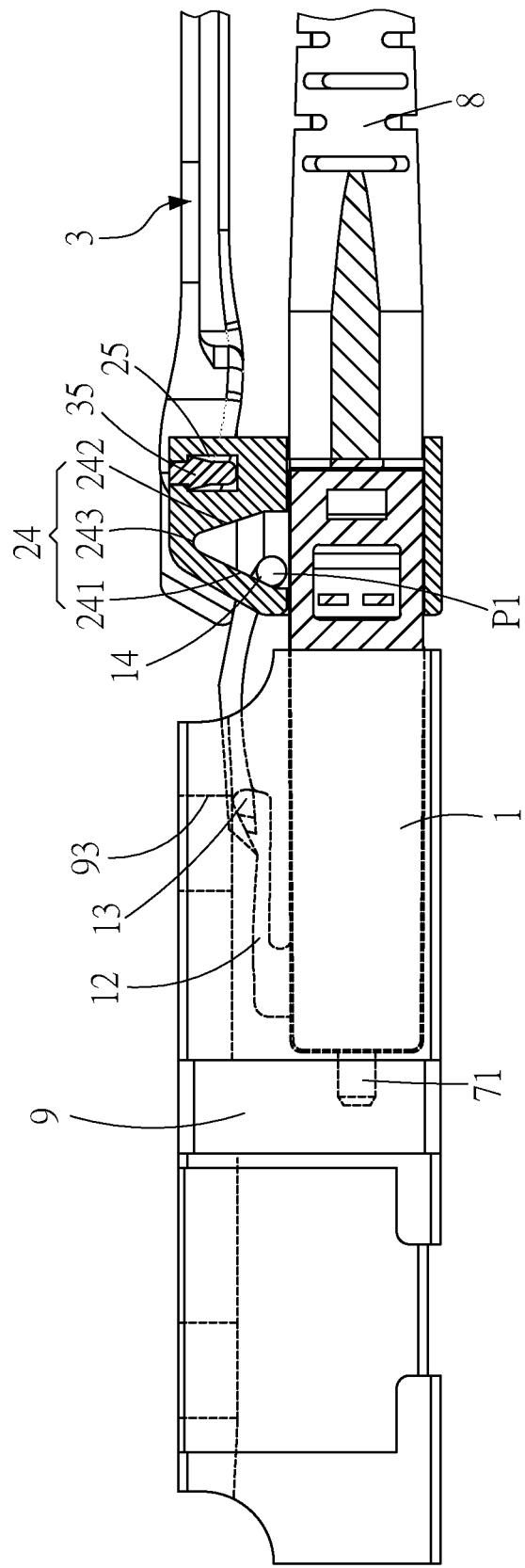
FIG. 8 illustrates a schematic side view showing that the fiber optical connector of the embodiment is detached from an adapter.

As shown in FIGS. 1 to 4, in this embodiment, each of the elastic arms 12 comprises a pair of engaging protrusions 13 and a pair of protruding blocks 14. The engaging protrusions 13 are outwardly protruding from two sides of the elastic arm 12, respectively. The protruding blocks 13 are outwardly protruding from two sides of a middle portion of the elastic arm 12, respectively, for buckling with a buckling portion 93 of an adapter 9 (as shown in FIG. 8). The protruding blocks 14 are outwardly protruding from two sides of an end portion of the elastic arm 12.

As shown in FIGS. 1 to 4, in this embodiment, the slidable block 2 is a rectangular hollowed block fitted out of the connector housing 1. The slidable block 2 comprises a plurality of sidewalls 21 and a plurality of slidable grooves 24 formed on side surfaces of the sidewalls 21. The sidewalls 21 are outwardly protruding from a top portion of the slidable block 2, and the protruding blocks 14 are respectively engaged in the slidable grooves 24. One side of each of the sidewalls 21 comprises a buckling groove 25, and each of the buckling grooves 25 is inwardly recessed from a top surface of the corresponding sidewall 21. In this embodiment, each of the slidable grooves 24 comprises a front inclined surface 241, a rear inclined surface 242, and a recessed portion 243 connected to a top portion of the front inclined surface 241 and a top portion of the rear inclined surface 242, as shown in FIG. 5.

As shown in FIGS. 1 to 4, in this embodiment, the handle 3 is an elongated plate. One of two ends of the handle 3 is connected to the slidable block 2, and the other end of the handle 3 is extending above the transmission cable. An extension block 31 is extending from one end of the handle 3 and the extension block 31 is received between the sidewalls 21. The handle 3 comprises a plurality of buckling blocks 35 located out of the extension blocks 31. The buckling blocks 35 are respectively engaged in the buckling grooves 25. The handle 3 with extended length allows a user to operate and to apply force on the handle 3 to move the slidable block 2 conveniently. Moreover, two sides of the front end of the handle 3 forms a mating structure, so that the handle 3 can be moved from top to bottom and mated in a corresponding portion of the slidable block 2, thereby facilitating the assembly of the fiber optical connector 1.

Figure 5:
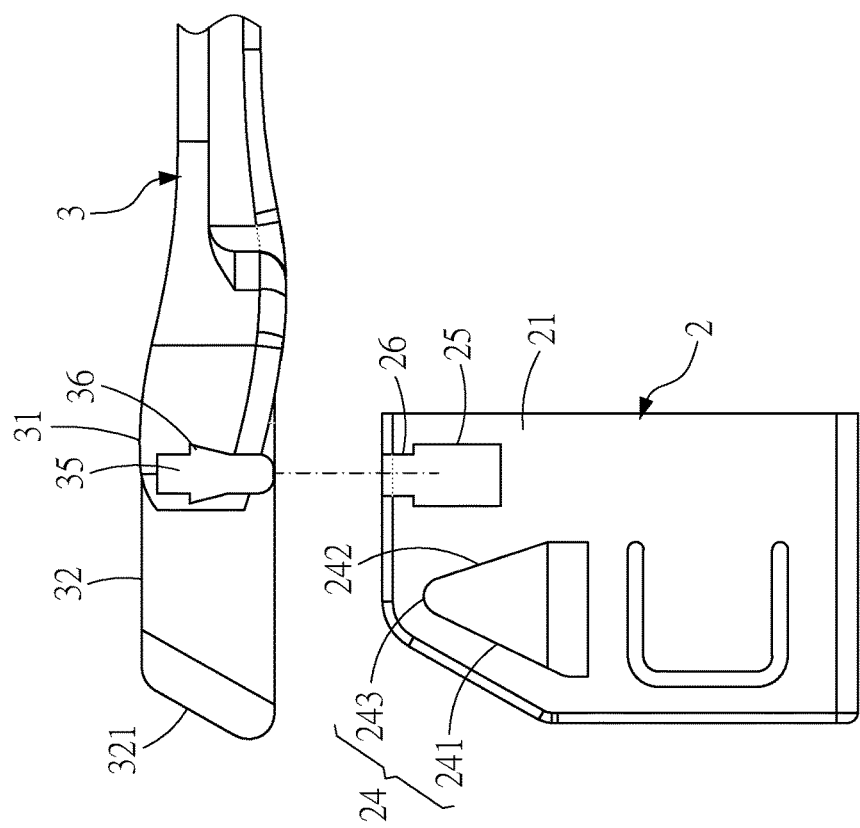
FIG. 5 illustrates a side exploded view of the slidable block and the handle of the fiber optical connector of the exemplary embodiment.
Figure 6:
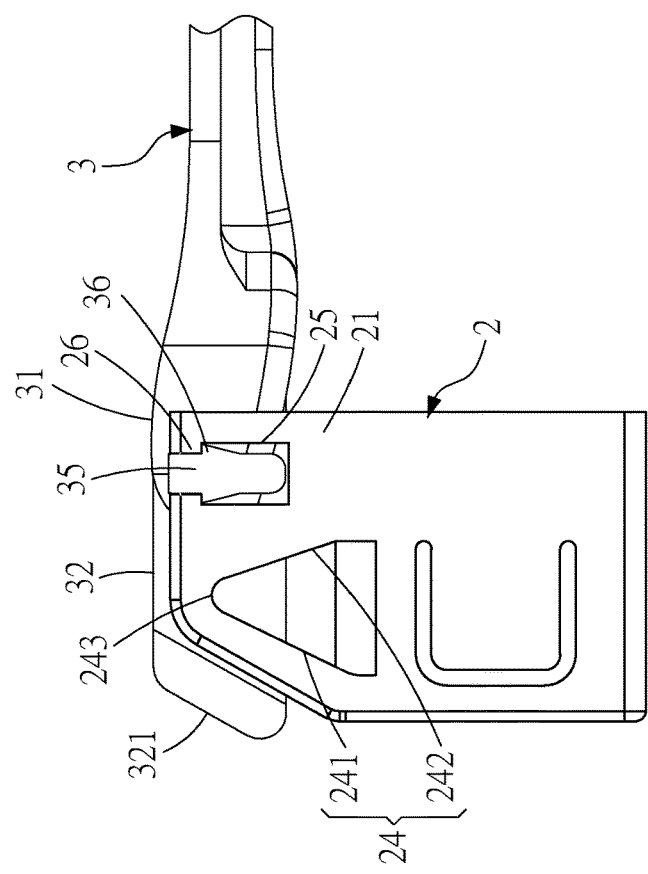
FIG. 6 illustrates an assembled side view of the slidable block and the handle of the fiber optical connector of the exemplary embodiment.

Please refer to FIGS. 5 and 6. FIG. 5 illustrates a side exploded view of the slidable block 2 and the handle 3, and FIG. 6 illustrates an assembled side view of the slidable block 2 and the handle 3. In this embodiment, each of the sidewalls 21 comprises an engaging block 26 at an opening portion of the corresponding buckling groove 25, and each of the buckling blocks 35 comprises a stopping block 36 engaged with the corresponding engaging block 26. Hence, the handle 3 can be prevented from being detached off the slidable block 2.

As shown in FIGS. 1 to 4, in this embodiment, the slidable block 2 comprises a plurality of separation blocks 22 between the sidewalls 21. The separation blocks 22 and the sidewalls 21 are configured on the slidable block 2 in a same manner. Moreover, the handle 3 comprises an extension arm 32 between the extension blocks 31, and the extension arm 32 is received between the separation blocks 22. Furthermore, an end surface of each of the separation blocks 22 forms an inclined surface 221, and an end portion of the extension arm 32 comprises a shielding plate 321 covering the inclined surfaces 221. In other words, the front end of the middle portion of the handle 3 has a front-blocking structure and a back-blocking structure. Hence, when the handle 3 is used to pull or push the slidable block 2, the force applied to the handle 3 can be properly distributed over the handle 3 to prevent the deformation at the front end of the handle 3. Such configuration also allows the user to apply the force to the handle 3 appropriately.

As shown in FIGS. 1 to 4, in this embodiment, the slidable block 2 comprises a plurality of receiving grooves 20 and a plurality of hooks 28 formed on an inner surface of each of the receiving grooves 20. An outer surface of each of the connector housings 1 comprises a plurality of recessed grooves 18 for engaging with the hooks 28.

Hence, the slidable block 2 can be stopped from moving toward the rear end of the connector housings 1 to detach from the connector housings 1.

As shown in FIGS. 1 to 4, in this embodiment, the outer surface of each of the connector housings 1 comprises a plurality of stopping portions 17 abutted against end surfaces of the slidable block 2. Hence, the slidable block 2 can be stopped from moving toward the front end of the connector housings 1.

Figure 7:
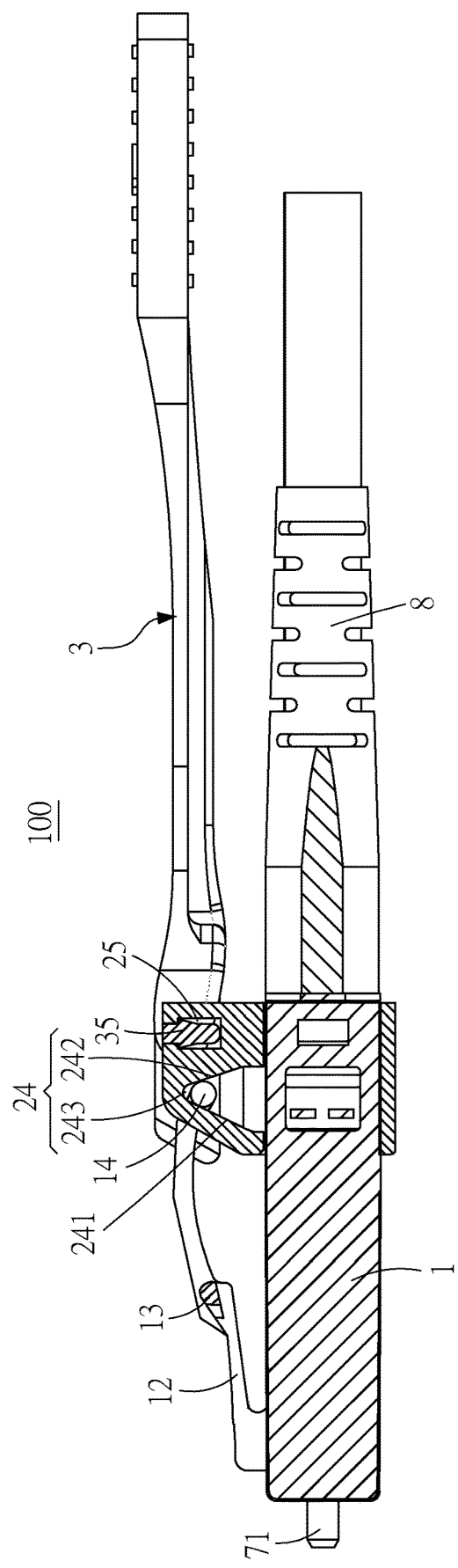
FIG. 7 illustrates a side sectional view of a fiber optical connector according to one embodiment of the instant disclosure.
Figure 9:
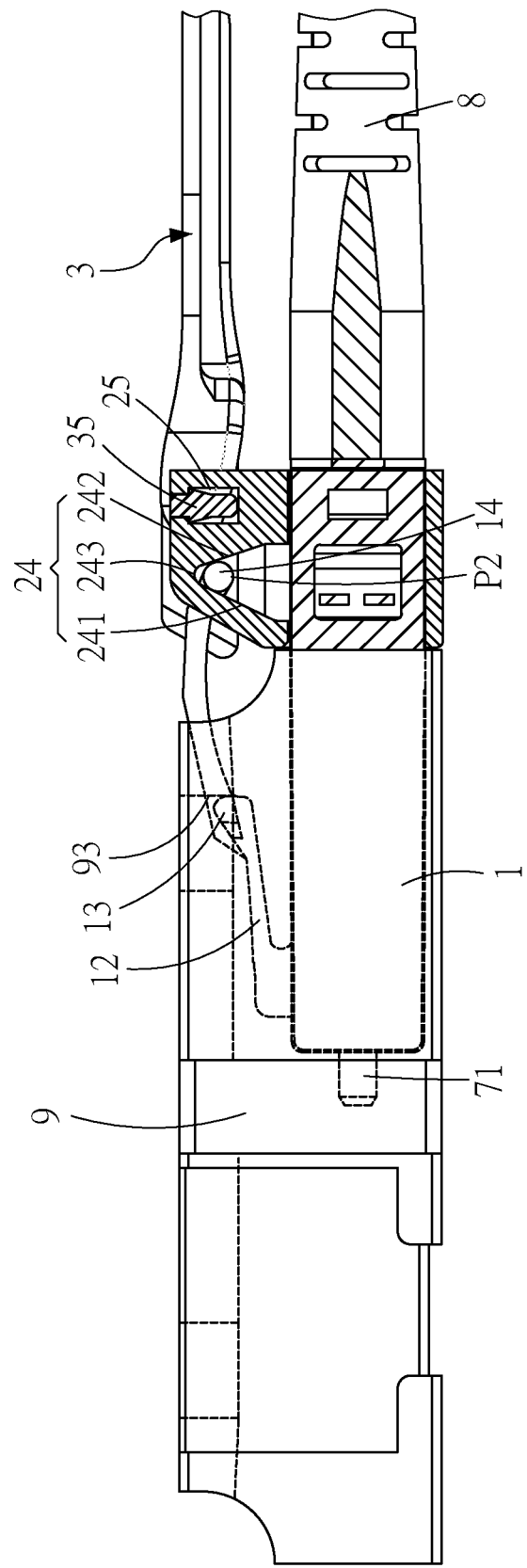
FIG. 9 illustrates a schematic side view showing that the fiber optical connector of the embodiment is assembled with the adapter.

Please refer to FIG. 2, and FIGS. 7 to 9. FIG. 7 illustrates a side sectional view of a fiber optical connector 100 according to one embodiment, FIG. 8 illustrates a schematic side view showing that the fiber optical connector 100 of the embodiment is detached from an adapter 9, and FIG. 9 illustrates a schematic side view showing that the fiber optical connector 100 of the embodiment is assembled with the adapter 9. In this embodiment, when the handle 3 is pulled, the slidable block 2 is moved on the connector housings 1 in a lateral direction. When the slidable block 2 is moved to a first position P1, each of the protruding blocks 14 slides to the front inclined surface 241 and drives the corresponding engaging protrusion 13 to move. Then, the elastic arm 12 swings downwardly, and the engaging blocks 13 are detached from the buckling portions 93 of the adapter 9, and the fiber optical connector 100 can be detached from the adapter 9.

When the slidable block 2 is moved to a second position P2, each of the protruding blocks 14 slides to the recessed portion 243 and drives the corresponding engaging protrusion 13 to move. The elastic arm 12 is an element with resilient flexibility. When the fiber optical connector 100 is inserted into the housing of the adapter 9, the engaging protrusions 13 are buckled with the buckling portions 93 because of the resilient flexibility of the elastic arms 12, and the fiber optical connector 100 is held in the housing of the adapter 9. Then, the elastic arm 12 swings upwardly, and the elastic arm 12 resiliently moves to the preset position.

As shown in FIGS. 2 and 3, in this embodiment, the fiber optical connector 100 comprises a plurality of core components 7 respectively assembled in the connector housings 1.

Each of the core components 7 comprises an insertion pin 71 at the corresponding opening 111. In this embodiment, each of the core components 7 comprises a core member 73, a spring 75, and a sleeve piece 76. The core member 73 is made of ceramics and used for enclosing optical fiber cables, and the optical fiber cables are aligned with the core hole of the core member 73. The insertion pin 71 is at one of two ends of the core member 73. One of two ends of the sleeve piece 76 is fitted over the other end of the core member 73, and the other end of the sleeve piece 76 is connected to the transmission cable. The sleeve piece 76 is assembled at the rear portion of the connector housings 1. The spring 75 is fitted over the other end of the core member 73 and received in the sleeve piece 76. One of two ends of the spring 75 is abutted against the core member 73, and the other end of the spring 75 is abutted against the sleeve piece 76. The spring 75 allows the core member 73 to have a buffering upon being forced.

Figure 10:
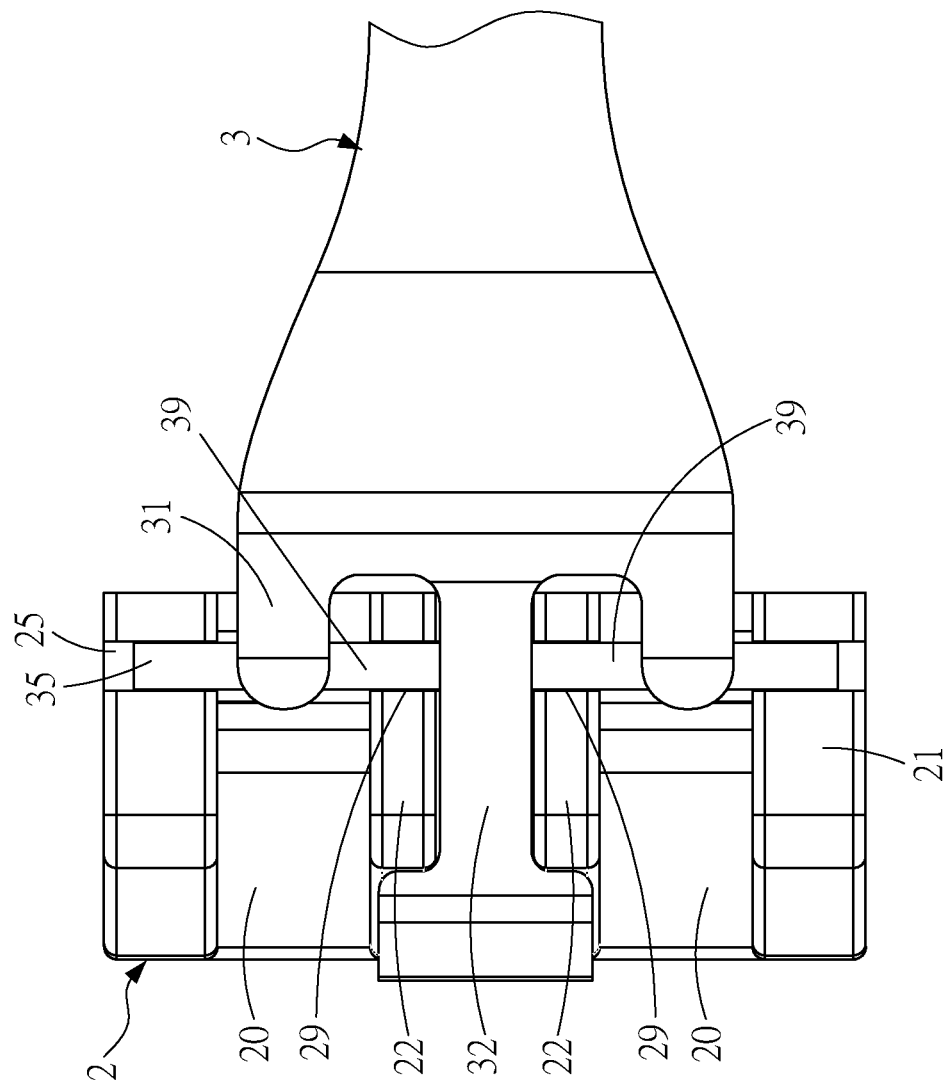
FIG. 10 illustrates a top view of the slidable block and the handle of a fiber optical connector according to another exemplary embodiment of the instant disclosure.

Please refer to FIG. 10. FIG. 10 illustrates a top view of the slidable block 2 and the handle 3 of a fiber optical connector 100 according to another exemplary embodiment of the instant disclosure. In some embodiments, one side of each of the separation blocks 22 comprises a mating groove 29, and two sides of the extension arm 32 comprise mating blocks 39 each engaged with the corresponding mating groove 29. Hence, the engagement between the handle 3 and the slidable block 2 can be further improved, thereby allowing the user to apply the force to the handle 3 appropriately.

Figure 11:
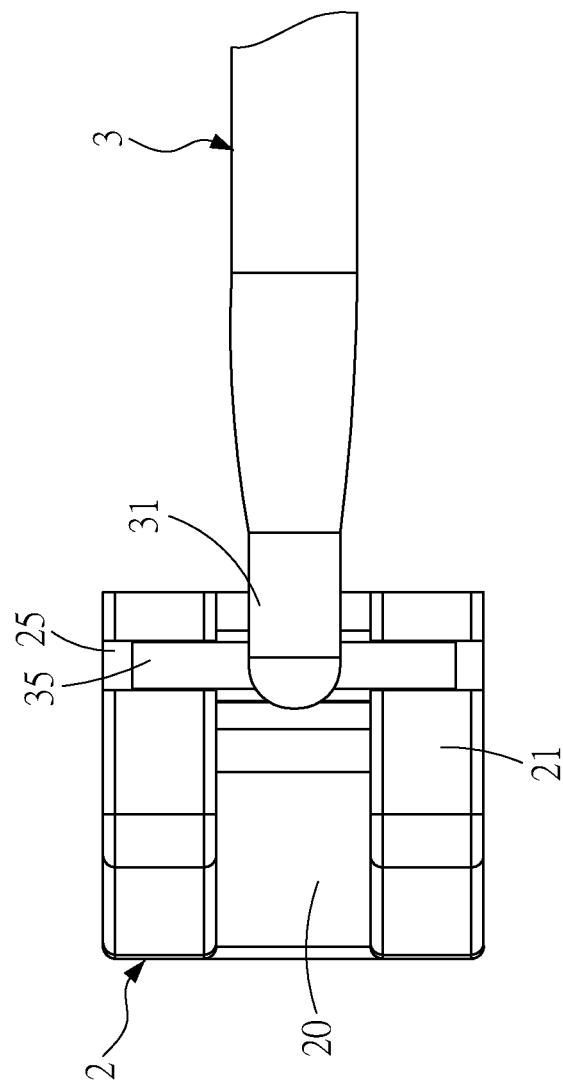
FIG. 11 illustrates a top view of an fiber optical connector according to a second embodiment of the instant disclosure.

Please refer to FIG. 11. FIG. 11 illustrates a top view of a fiber optical connector 100 according to a second embodiment of the instant disclosure. As shown in FIG. 2, in the first embodiment, the fiber optical connector 100 comprises a plurality of connector housings 1; conversely, in the second embodiment, the fiber optical connector 100 comprises one connector housing 1. In this embodiment, an extension block 31 is extending from one end of the handle 3 and the extension block 31 is received between the sidewalls 21. Buckling blocks 35 are extending from two sides of the extension block 31, and the buckling blocks 35 are respectively engaged in the buckling grooves 25. Moreover, the slidable block 2 comprises a receiving groove 20 and a plurality of hooks 28 formed on the inner surface of the receiving groove 20 (same to the hook 20 shown in FIG. 3). The connector housing 1 is received in the receiving groove 20, and the outer surface of the connector housing 1 forms a plurality of recessed grooves 18 for engaging with the hooks 28.

Accordingly, in one or some embodiments of the instant disclosure, the fiber optical connector is provided with an extension handle, so that the user can operate and force to the handle to move the slidable block in a convenient manner. Moreover, the buckling block of the handle is engaged with the buckling grooves of the slidable block, thereby increasing the mating force between the fiber optical connector and the adapter upon assembling or detaching.

Moreover, in one or some embodiments of the instant disclosure, the extension arm of the handle is received between the separation blocks. Hence, when the handle is used to pull or push the slidable block, the force applied to the handle can be properly distributed over the handle to prevent the deformation at the front end of the handle. Such configuration also allows the user to apply the force to the handle appropriately. Furthermore, two sides of the front end of the handle forms a mating structure, so that the handle can be moved from top to bottom and mated in a corresponding portion of the slidable block, thereby facilitating the assembly of the fiber optical connector.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fiber optical connector, comprising:
    a connector housing, wherein the connector housing comprises an elastic arm, the elastic arm is leaning at an angle and outwardly extending from an outer surface at a front end of the connector housing, and two sides of the elastic arm respectively comprise a pair of engaging protrusions and a pair of protruding blocks;
    a slidable block fitted out of the connector housing, wherein the slidable block comprises a plurality of sidewalls and a plurality of slidable grooves formed on side surfaces of the sidewalls; the protruding blocks are respectively engaged in the slidable grooves, and one side of each of the sidewalls comprises a buckling groove; and
    a handle, wherein an extension block is extending from a first end of the handle and the extension block is received between the sidewalls, the handle comprises a plurality of buckling blocks located out of the extension block, and the buckling blocks are respectively engaged in the buckling grooves.

2. The fiber optical connector according to claim 1, wherein each of the sidewalls comprises an engaging block at an opening portion of the corresponding buckling groove, and each of the buckling blocks comprises a stopping block engaged with the corresponding engaging block.

3. The fiber optical connector according to claim 1, wherein the slidable block comprises a plurality of separation blocks between the sidewalls, a plurality of extension blocks is further extending from the first end of the handle, and the extension blocks are received between the sidewalls; the handle comprises an extension arm between the extension blocks, and the extension arm is received between the separation blocks.

4. The fiber optical connector according to claim 3, wherein an end surface of each of the separation blocks forms an inclined surface, and an end portion of the extension arm comprises a shielding plate covering the inclined surfaces.

5. The fiber optical connector according to claim 3, wherein one side of each of the separation blocks comprises a mating groove, and two sides of the extension arm comprise mating blocks each engaged with the corresponding mating groove.

6. The fiber optical connector according to claim 1, wherein the slidable block comprises a receiving groove and a plurality of hooks formed on an inner surface of the receiving groove, an outer surface of the connector housing comprises a plurality of recessed grooves for engaging with the hooks.

7. The fiber optical connector according to claim 6, wherein the outer surface of the connector housing comprises a plurality of stopping portions abutting against an end surface of the slidable block.

8. The fiber optical connector according to claim 1, wherein each of the slidable grooves comprises a front inclined surface, a rear inclined surface, and a recessed portion connected to a top portion of the front inclined surface and a top portion of the rear inclined surface.

9. The fiber optical connector according to claim 8, wherein when the slidable block is moved to a first position, each of the protruding blocks slides to the corresponding front inclined surface and drives the corresponding engaging protrusion to move.

10. The fiber optical connector according to claim 9, wherein when the slidable block is moved to a second position, each of the protruding blocks slides to the corresponding recessed portion and drives the corresponding engaging protrusion to move.

* * * * *